United States Patent [19]

Hutto, Jr.

[11] 4,168,234

[45] Sep. 18, 1979

[54] ROTARY PRESSURE PRECOAT FILTER WITH INTERNAL VALVING ARRANGEMENT

[75] Inventor: Francis B. Hutto, Jr., Grand Junction, Colo.

[73] Assignee: Johns-Manville Corporation, Denver, Colo.

[21] Appl. No.: 845,994

[22] Filed: Oct. 27, 1977

[51] Int. Cl.² .................................................. B01D 33/08
[52] U.S. Cl. ..................................... 210/193; 210/404
[58] Field of Search .................. 210/75, 193, 402, 404

[56] References Cited

U.S. PATENT DOCUMENTS

| | | | |
|---|---|---|---|
| 2,107,664 | 2/1938 | Gee | 210/181 |
| 2,174,748 | 10/1939 | Hunter | 210/395 |
| 2,655,265 | 10/1953 | Little | 210/404 X |
| 3,029,948 | 4/1962 | McKay | 210/402 X |
| 3,245,536 | 4/1966 | McKay | 210/402 X |
| 3,520,410 | 7/1970 | Hutto, Jr. | 210/75 X |

OTHER PUBLICATIONS

Smith et al., "Pressure Filtration of Liquified Coal," 8/3/77, 4th Annual Int. Cong. on Coal Gasification, Pittsburgh, Pa.

Primary Examiner—Robert H. Spitzer
Attorney, Agent, or Firm—Robert M. Krone; Josep J. Kelly; James W. McClain

[57] ABSTRACT

A rotary pressure precoat filter system is described containing an interior valving arrangement which increases the gas flow resistance through that region of the precoat from which solids have been removed but which has not yet been reimmersed in the slurry to be filtered. The valving system comprises a fixed baffle positioned adjacent to the outlet end of conduits passing from the collection chambers inside the surface of the filter drum to the interior of a hollow central shaft, which is journaled in bearings outside the pressure vessel and which provides direct access to a receiver also outside the pressure vessel.

13 Claims, 2 Drawing Figures

ROTARY PRESSURE PRECOAT FILTER WITH INTERNAL VALVING ARRANGEMENT

BACKGROUND OF THE INVENTION

The invention herein relates to rotary pressure precoat filters.

Rotary pressure precoat filters work on the same principle as the more common rotary vacuum precoat filters, i.e., the use of a pressure differential across the precoat layer to force the filtrate through the precoat and filter septum leaving the solid material collected in a layer on the top of the precoat layer. The common rotary vacuum precoat filter is limited to the pressure differential between ambient air pressure on the outside of the filter and the reduced pressure on the inside, a differential theoretically as high as 14.7 psi (1 atm) but which in practice is somewhat less. The rotary pressure precoat filter, on the other hand, operates inside a pressure vessel so that the external pressure on the filter can be substantially higher than ambient pressure. Thus the pressure differential across the filter can be many times higher than that obtainable with the rotary vacuum precoat filter. Pressure differentials across a rotary pressure precoat filter can be as high as several hundred psi (several tens of atmospheres). This permits filtration at reasonable flow rates of many viscous and volatile liquids which cannot practically be filtered by rotary vacuum precoat filters.

Rotary precoat filters, both vacuum and pressure, include means for continuously removing the collected solids and a thin top layer of the precoat as the filter revolves. There is therefore always a short section of precoat layer which is not covered with the cake of filtered solids and therefore is less resistant to pressure on the surface of the filter drum between the location of the removal means and the point where the drum surface reenters the slurry vat. The reduced gas resistance through this segment of the precoat serves to reduce the efficiency of the filter for the reduced pressure differential creates a tendency for the driving gas to "bypass" other sections of the filter cake where there is greater resistance and pass through this zone of lower resistance. To compensate for this effect and maintain adequate pressure differential unduly large quantities of gas must be used.

In a rotary vacuum precoat filter this "bypassing effect" is minimal because the total pressure differential across the filter cake is small and thus a slight reduction at one point does not cause significant practical complications. With a rotary pressure precoat filter, however, where the pressure differential across the filter is large, the bypassing effect caused by the reduced pressure differential can result in a marked increase in volume of gas recirculation. Consequently it would be of definite interest to have a rotary pressure precoat filter which incorporates means to reduce the bypassing effect. Such means must not detrimentally affect the efficiency of the filter.

Conventional rotary pressure precoat filters, being sealed in pressure vessels, present significant problems of maintenance, particularly for moving parts such as bearings and seals. Unless one uses elaborate and complicated remotely controlled devices for such services as lubrication and cleaning, routine maintenance requires shutting down and depressurizing the unit so that the pressure vessel can be opened and the maintenance performed. The deficiencies of this system and the costs of both the labor involved and the lost production are evident. It would therefore be distinctly advantageous to have a rotary pressure precoat filter system wherein those components such as bearings and seals which most commonly require periodic maintenance are readily accessible for such maintenance without the necessity of depressurizing or otherwise shutting down operation of the system.

BRIEF SUMMARY OF THE INVENTION

The invention herein is a rotary pressure precoat filter system having seals and bearings which are accessible from outside the pressure vessel encasing the filter and which incorporates means comprising an internal valving or baffling arrangement which substantially reduces the gas bypassing effect during operation of the filter. This filter system comprises a pressure vessel, a hollow shaft journaled outside the pressure vessel for rotation and extending into the interior of the vessel, a cylindrical drum with a foraminous surface mounted on the shaft and rotatable therewith, a plurality of conduit means leading from the foraminous surface to the interior of the hollow shaft, and resistance means within the shaft to restrict gas flow in at least one of the conduit means when the resistance to gas flow in that conduit means decreases significantly relative to the level of gas resistance in the other conduit means.

DETAILED DESCRIPTION AND PREFERRED EMBODIMENTS

Figure 1:
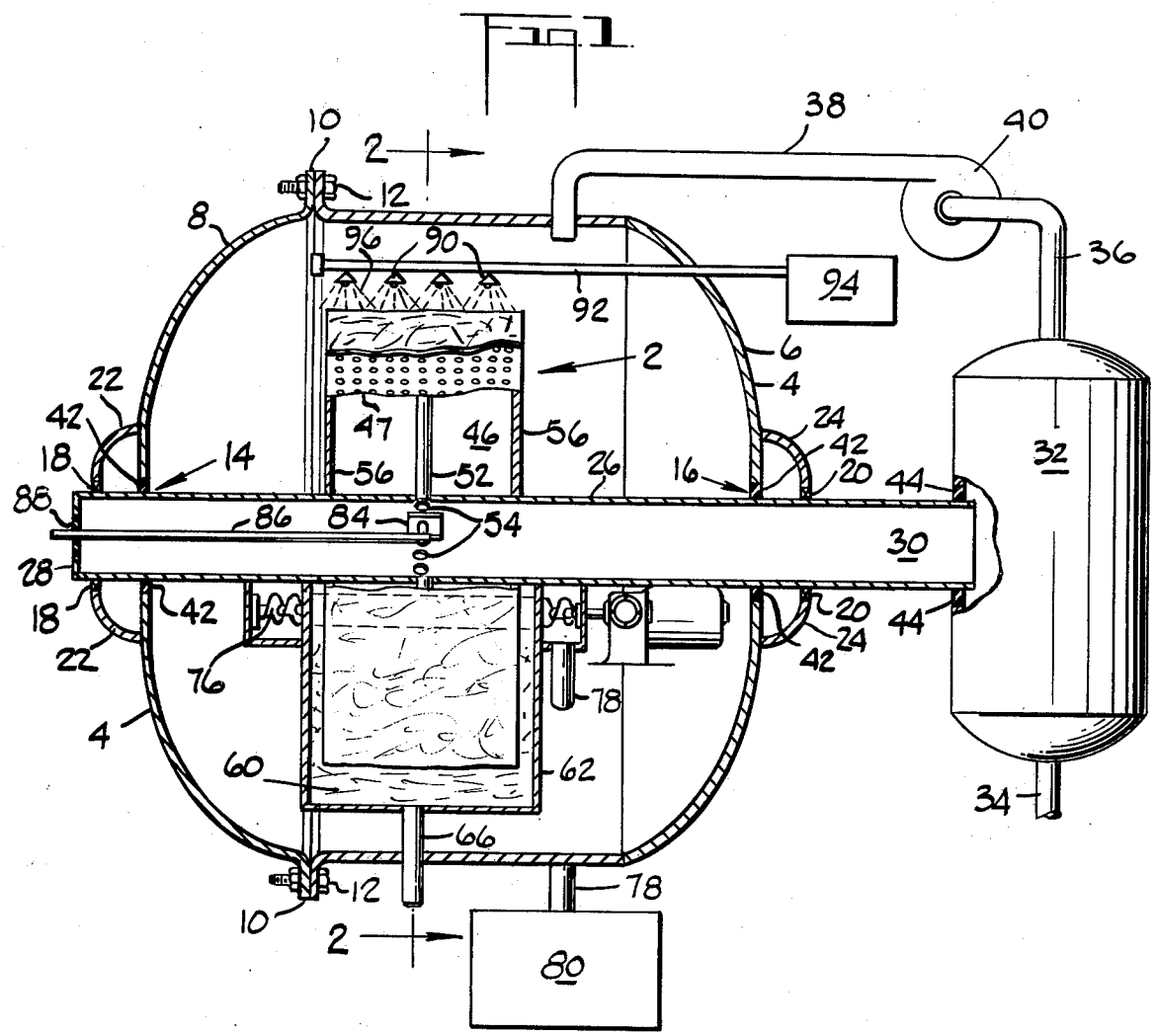
FIG. 1 is an elevation view partially in cross-section of the rotary pressure precoat filter system of the present invention.
Figure 2:
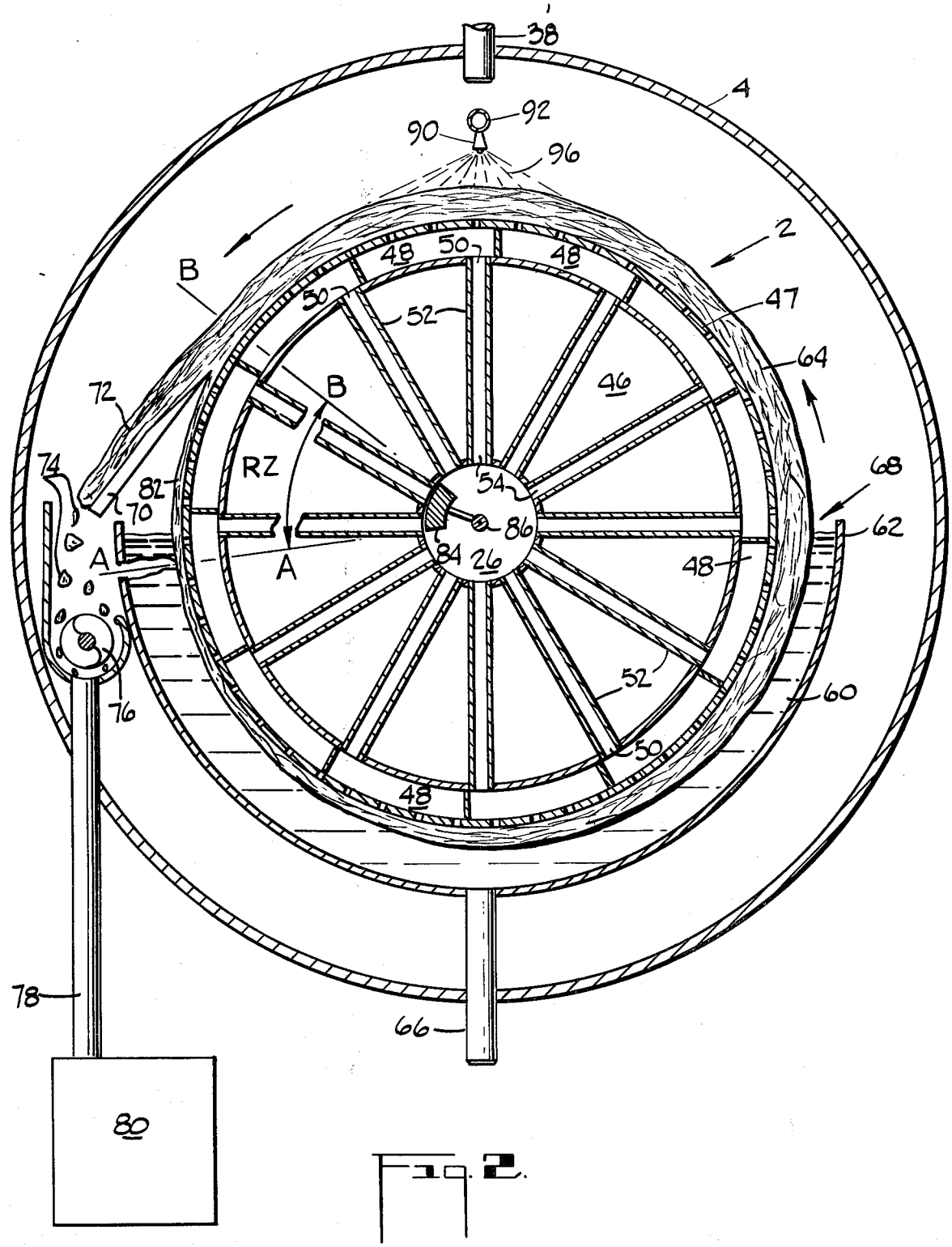
FIG. 2 is a cross-sectional elevation view taken on plane 2—2 of FIG. 1.

The system of this invention and its operation will be best understood by reference to the drawings. The overall system is best illustrated in FIG. 1 and the details of the filter drum and valving arrangement are best illustrated in FIG. 2.

The central component of this system is the rotary pressure precoat filter 2 which is housed inside pressure vessel 4. Pressure vessel 4 consists of a main section 6 which is closed by a head 8, the two being secured by conventional means such as flanges 10 and bolts 12. Conventional gasketing means (not shown) will normally be used to seal the vessel head 8. Pressure vessel 4 is penetrated by two openings 14 and 16 in opposite sides of the vessel. In the embodiment shown one opening is in the head 8 and one in the main section 6, although this is not required; both openings may be in the main section if the shape of the pressure vessel permits. Mounted adjacent to and outwardly of openings 14 and 16 and axially aligned therewith are bearings 18 and 20. Alignment in the embodiment shown is provided by brackets 22 and 24 which are attached to the outside of pressure vessel 4, but other means of alignment and bearing supports can be used.

Journaled for rotation in bearings 18 and 20 is hollow shaft 26 which penetrates entirely through the interior of pressure vessel 4 and extends outwardly beyond openings 14 and 16 and through bearings 18 and 20. One end 28 of hollow shaft 26 is closed. The other end 30 extends beyond its bearing (in this embodiment bearing 20) and penetrates into receiver vessel 32. End 30 of hollow shaft 16 remains open so as to provide free fluid passage from the interior of hollow shaft 26 into the interior of receiver vessel 32.

Receiver vessel 32 is itself a pressure vessel into which the filtrate liquid from filter 2 is discharged. A drain 34 is used to remove filtrate liquid from receiver vessel 32 either continuously or periodically. The filtrate liquid may then be collected or disposed of by conventional means not shown. The pressurizing gas (such as air, a hydrocarbon or nitrogen) which is the driving means for the filtration of the liquid in the present system also passes through hollow shaft 26 into receiver 32 and is recycled through lines 36 and 38 an compressor 40 back to the interior of vessel 4.

Where shaft 26 penetrates the walls of pressure vessel 4 it is sealed by conventional high pressure rotary shaft seals 42; similarly it is sealed by conventional rotary shaft seals 44 where it penetrates the wall of receiver 32.

Mounted securely to shaft 26 and free to rotate with it is cylindrical drum 46. The outer component of drum 46 is foraminous plate 47. Entirely around the inner surface of plate 47 is a plurality of collection chambers 48. In the embodiment shown there are twelve equally sized collection chambers 48 each of which extends axially for the full axial width of the drum 46. Use of a full axial width collection chamber simplifies the valving arrangement of this invention and is therefore preferred. However, each collection chamber 48 could be divided into several smaller chambers arranged axially so as to cover the entire width of drum 46 if desired. This will require modifications in the valving arrangement, as will be explained below. Similarly, the division of the collection chambers into twelve radially disposed chambers is not critical; any number of chambers can be used. It would be expected that for structural purposes larger drums will have more chambers disposed radially while smaller drums will have fewer chambers.

Each of the collection chambers 48 is in the form of an open-topped box where the top is covered by a segment of plate 47. Collection chamber 48 has only a single opening (other than at the top), opening 50 which leads into conduit 52 at the trailing end of chamber 48. Conduit 52 in turn is joined to hollow shaft 26 into which it opens through opening 54. The axial ends of drum 46 are closed by sidwalls 56. Sidewalls 56 serve to stiffen the structure of hollow drum 46 and also keep liquid from reservoir 62 from flowing into the interior of drum 46.

If there is more than one collection chamber 48 extending axially at each radial position of drum 46, there will have to be additional conduits 52, one for each axial collection chamber 48. Unless the drum 46 is of exceptional size, one collection chamber 48 extending the full axial width of drum 46 at each radial location (as shown) is adequate. This avoids the need for additional conduits 52 at each radial position and also avoids the need to lengthen or multiply the restricting baffled 84.

In operation, drum 46 revolves (counterclock-wise in the embodiment shown) as shaft 26 revolves. Shaft 26 is driven through external means not shown. Such external drive means could be for instance a motor and pulley arrangement attached to end 28 of shaft 26 or a motor driven gear reduction unit also attached to end 28 of shaft 26. As drum 46 revolves its lower portion passes submerged through fluid 60 which is held in reservoir 62. Initially fluid 60 is a clear liquid such as oil or water containing a precoating agent such as diatomacious earth. Pressure and/or vacuum is used at this stage of the operation to force the fluid 60 through the drum 46 and deposit a precoat layer 64 on the plate 47. Such precoating technique is conventional and continues until the desired depth of precoat layer has been built up on the surface of plate 47. Thereafter the fluid to be filtered and any body feed filter aid is passed into reservoir 62 through supply line 66, the entire system inside pressure vessel 4 pressurized to the desired pressure (if it has not already been pressurized during the precoat stage) and the filtration begun. As the liquid 60 is forced through the precoat layer the undissolved solid materials in the liquid are trapped on the surface of the precoat layer forming a cake while the liquid passes through into collection chamber 48 and then on through conduit 52 and shaft 26 for collection in receiver 32. As drum 46 rotates each segment of plate 47 passes through reservoir 62 and liquid 60 accumulating solid material on the precoat until it rotates out of the reservoir at point 68. Thereafter the precoat and cake are dried as the drum 46 rotates until the particular point in question reaches cutting device 70, in this case illustrated as a doctor blade. (Another cutting device useful in this invention is the rotary knife described in U.S. Pat. No. 3,520,410 issued to F. B. Hutto.) At this point the accumulated solids as well as a thin upper layer of the precoat are removed as shown at 72 (the actual depth of material removed is exaggerated in FIG. 2 for clarity). The removed solid materials 74 are collected as by screw conveyor 76 and passed through conduit 78 to collection chamber 80 from which they can be removed by conventional means not shown.

The focal point of the apparatus of this invention is in the region which will be designated herein as the "zone of reduced gas resistance" and indicated as "RZ" in FIG. 2. This is the region indicated by the double-headed arrow between lines A—A and B—B. It is here that the gas bypass effect occurs because of the reduced resistance caused by the cake removal from the precoat layer in the segment designated 82.

The present invention minimizes the effect of gas bypassing by increasing the resistance to gas flow for that segment of the filtration cycle which would otherwise be subject to bypassing. This is accomplished by a novel internal valving arrangement utilizing baffle 84 which is mounted in a fixed position inside hollow shaft 26 on support 86. Baffle 84 does not rotate with shaft 26 but rather is maintained in a fixed position by support 86, this position being predetermined relative to the resistance zone RZ. (The sealed end 28 of hollow shaft 26 maintains its pressure-tight condition by use of a conventional rotary shaft seal 88 where support 86 passes through end 28 to the support's anchorage point, not shown.) Thus as each collection chamber 48 and conduit 52 passes seriatim into resistance zone RZ the outlet opening 54 of conduit 52 is partially blocked by baffle 84 such that the resistance to gas flow is increased until it corresponds more nearly to the resistance to gas flow of the rest of the solids layer containing precoat, body feed and accumulated filtered solids. The tendency of the high pressure gas to bypass the other portions of the filter system in favor of passing through segment 82 is therefore substantially reduced or entirely eliminated. Normally effective results are obtained when the baffle 84 is positioned relative to the opening 54 such that the resistance to flow of pressurizing gas in the resistance zone is increased by the baffle by some 20% to 50%. The amount of resistance can be varied by simply positioning the baffle slightly closer to or slightly farther away from the opening 54. If desired, it is also possible to position the baffle such that the resistance is increased to the point that the overall resistance to pressurizing gas flow in the resistance zone RZ is greater than the resistance to gas flow over other portions of the filter, thus in effect "reversing" the bypass effect. Normally, however, this is not desirable because of the need to continue passing gas through the precoat layer segment 82 to remove residual filtrate liquid which may still be contained therein.

In addition, filter systems commonly include a wash liquid system composed of nozzles 90 which are fed by supply line 92 from wash liquid reservoir 94. Since the wash liquid 96 is normally a liquid which will displace the filtrate containing dissolved solids from the interstices of the filter cake, it is also desirable to have a positive flow of pressurizing gas through segment 82 to aid in the washing action of liquid 96.

What is claimed is:

1. A rotary pressure precoat filter system comprising:
   (a) a pressure vessel;
   (b) a hollow shaft journaled outside said pressure vessel for rotation and extending into the interior of said pressure vessel;
   (c) a cylindrical drum mounted on said hollow shaft and fixed to turn therewith, said drum having a foraminous surface;
   (d) a plurality of conduit means leading from said foraminous surface to the interior of said hollow shaft;
   (e) resistance means disposed within said hollow shaft to restrict gas flow in at least one of said plurality of conduit means when the resistance to gas flow in said at least one of said plurality of conduit means decreases significantly relative to the resistance to gas flow in the remainder of said plurality of conduit means; and
   (f) removal means for removing filtered solids from the suface of a precoat on said drum, said removal means being located respective to said drum in a position to effect said removal during the precoat drying portion of the filter cycle.

2. A rotary pressure precoat filter system as in claim 1 further comprising:
   (g) receiver means at one end of said shaft to receive discharge of filtrate liquid from the interior of said shaft.

3. A rotary pressure precoat filter system as in claim 2 further comprising recycle means to pass pressuring gas from said receiver to the interior of sid pressure vessel.

4. A rotary pressure precoat filter system as in claim 1 wherein said resistance means comprises a baffle.

5. A rotary pressure precoat filter system as in claim 4 wherein said baffle is disposed adjacent to the exit of said at least one of said plurality of conduit means.

6. A rotary pressure precoat filter system as in claim 4 wherein said baffle is positioned within said hollow shaft such that the resistance to gas flow in said at least one of said plurality of conduit means is increased by 20%–50%.

7. A rotary pressure precoat filter system as in claim 1 wherein said resistance means is positioned within said hollow shaft such that the resistance to gas flow in said at least one of said plurality of conduit means is increased by 20%–50%.

8. A rotary pressure precoat filter system comprising:
   (a) a pressure vessel having a pair of oppositely disposed openings through the walls thereof;
   (b) bearings disposed outside of said pressure vessel and aligned coaxially with said pair of openings;
   (c) a hollow shaft extending across the interior of said vessel and through said openings and journaled to rotate in said bearings, with one end of said shaft extending beyond its bearing and the other end being sealed;
   (d) a receiver vessel having an opening through the wall thereof, through which opening penetrates the open extended end of said shaft;
   (e) a hollow cylindrical drum mounted on said shaft inside said pressure vessel and free to rotate with said shaft, said drum comprising:
      (i) an outer foraminous shell adapted to support a precoat layer and provide fluid access to the interior of said drum;
      (ii) a plurality of collection chambers disposed in adjacent positions around the circumference of said drum and underlying the expanse of said foraminous shell; and
      (iii) a plurality of conduit means each of which connects one of said collection chambers with said shaft and provides fluid access from the interior of said collection chamber to the interior of said shaft, wherein said plurality of conduit means are disposed around said shaft in the same sequence as their respective chambers are disposed around said shell;
   (f) reservoir means which partially surround said drum and in which solid and liquid material to be filtered is retained, through which reservoir means said drum rotates and accumulates filtered solids on the surface of the precoat supported thereon;
   (g) removal means for removing said filtered solids from said surface of said precoat layer at a point in the rotation of said drum ahead of the drum surface's point of reentry into said reservoir means and while the precoat at the point of removal is in the drying portion of the filter cycle; and
   (h) resistance means interiorly of said hollow shaft disposed so as to restrict seriatim the flow of fluid through individual ones of said conduit means as each passes said resistance means during the rotation of said drum, said resistance means disposed so as to provide such restriction only for that portion of the rotational travel of the conduit means being restricted when the collection chamber to which said conduit means is attached is in the zone of reduced cake resistance.

9. A rotary pressure precoat filter system as in claim 8 wherein said resistance means comprises a baffle disposed adjacent to the discharge end of said conduit means where said conduit means is joined to and opens into said hollow shaft.

10. A rotary pressure precoat filter system as in claim 9 wherein said baffle is positioned within said hollow shaft such that the resistance to gas flow in said at least one of said plurality of conduit means is increased by 20%–50%.

11. A rotary pressure precoat filter system as in claim 8 further comprising conduit means providing fluid passage between said receiver vessel and said pressure vessel.

12. A rotary pressure precoat filter system as in claim 8 wherein each of said collection chambers extends axially across the full width of said foraminous shell.

13. A rotary pressure precoat filter system as in claim 8 wherein said resistance means is positioned within said hollow shaft such that the resistance to gas flow in said at least one of said plurality of conduit means is increased by 20%–50%.

* * * * *